L. W. CHUBB.
ELECTRICAL MEASURING INSTRUMENT.
APPLICATION FILED AUG. 10, 1916.
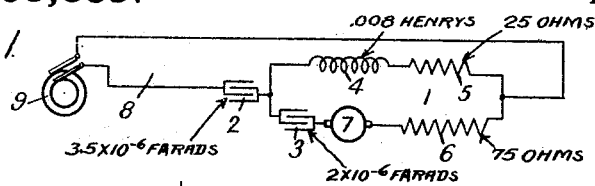
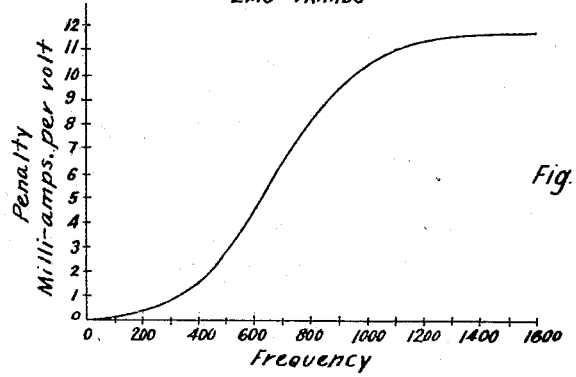
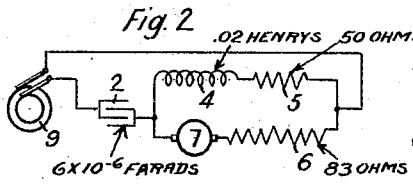
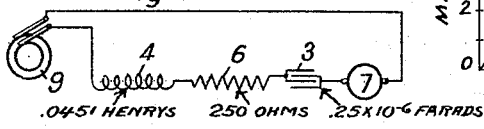
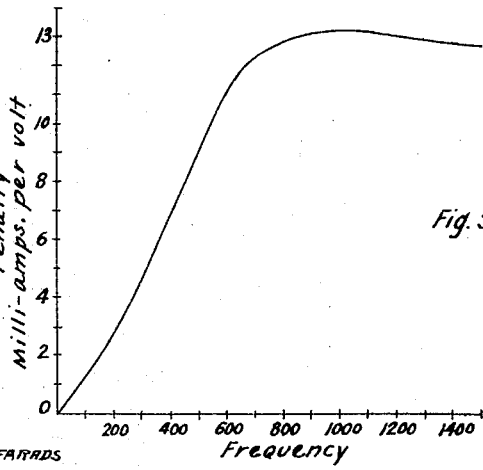
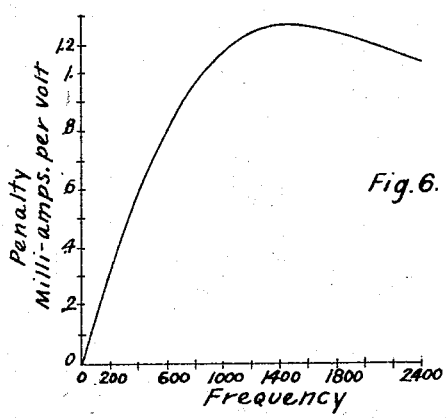
INVENTOR
Lewis W. Chubb

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,395,335.   Specification of Letters Patent.   Patented Nov. 1, 1921.

Application filed August 10, 1916. Serial No. 114,176.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to means for, and methods of, determining the penalty to be imposed against distorted voltage waves.

The object of my invention is to provide a standard circuit, the apparent admittance of the whole or a portion of which, with respect to the fundamental frequency, is a predetermined function of the frequency of the voltage wave.

It has been determined that, if a transmission circuit, upon which a distorted voltage wave is impressed, is disposed adjacent to a telephone circuit, the frequencies of the higher-harmonic components of the voltage wave will affect the intelligibility of the conversation over the telephone circuit in accordance with the frequency of the voltage impressed upon the transmission circuit. That is, the frequency of the higher harmonics will affect the telephone circuit in varying degrees, the maximum, as at present determined, being caused by the higher harmonics, such as the eleventh and the thirteenth. It is also well known that, if the lower frequency harmonic components, as the third, fifth and seventh, are unequal in the voltage waves of two dynamo-electric machines, cross-currents and undue heating will obtain if the machines are synchronized and operated in parallel relation. Thus, it has been suggested that all generators be so designed as to produce pure sine waves because telephone apparatus may be so constructed as to be substantially unaffected by the fundamental component of commercial frequencies. However, since it is expensive to build dynamo-electric machines that produce pure sine waves of voltage, it has been suggested that machines producing distorted voltage waves be penalized in accordance with the effects that such waves have upon adjacent circuits and upon the operating characteristics of the machines.

Heretofore, it was customary to determine the deviation of a distorted wave from the equivalent sine wave, permitting a deviation of five to ten per cent. of the maximum ordinate of the equivalent sine wave. Such determinations were laborious, required special apparatus and were unsatisfactory because they penalize all distorted harmonics equally. It has been suggested that wave distortations be limited by permitting a limiting value of differential distortion factor. However, this produces an unsatisfactory result because the harmonic components are penalized in direct proportion to their order, which is either too low for the relatively low harmonic frequencies or too high for the relatively high harmonic frequencies for any predetermined limit of differential distortion factor.

Various methods of weighting and penalizing distortional frequencies have been proposed, but, in order to perform tests, it was necessary to take oscillograms, analyze the wave and weight the harmonics in the desired manner.

By the use of my invention, the harmonics may be weighted in accordance with the desired function without the necessity of knowing the magnitude or order of the distortional harmonics.

In the carrying out of my invention, I provide a standard circuit comprising a resistor, a reactor, a condenser and a current-measuring instrument that are so connected and proportioned that the instrument will be traversed by current proportional to a predetermined agreed function of the frequency. The resistor, reactor and condenser may be so proportioned that the instrument will indicate in accordance with any predetermined law of the agreed penalty curve. That is, it will indicate a relatively small current when supplied with fundamental sine wave voltage, have a gradually increasing indication up to a predetermined frequency and decrease or remain substantially constant for all other harmonic frequencies above the predetermined value.

It will be understood that I do not limit my invention to an instrument for indicating in accordance with any one predetermined law because conditions may necessitate that these laws vary under different conditions. Thus, it may be determined that it is cheaper to provide devices for the telephone circuits which will protect the same for all frequencies below a predetermined relatively high value, or it may be determined that all frequencies due to the higher harmonics should be penalized similarly. However, my device may be so proportioned that the instrument will indicate in accordance with the agreed law under all conditions.

In the accompanying drawings, Figure 1 is a diagrammatic view of a measuring system embodying my invention; Figs. 2 and 3 are diagrammatic views of modified forms of measuring systems embodying my invention; Fig. 4 is a diagram illustrating the suggested penalties for different frequencies and the indications of a system shown in Fig. 1, and Figs. 5 and 6 are diagrams illustrating the indications of the systems shown in Figs. 2 and 3, respectively, for various frequencies.

In Fig. 1 of the drawings, a standard circuit 1 comprises a condenser 2, a condenser 3, a reactor 4, a resistor 5, a resistor 6 and a current-measuring device 7 which are so connected and of such values that, if the system is connected to a transmission circuit 8, the instrument 7 will be traversed by currents which are proportional to a predetermined function of the frequency of a generator 9 that is supplying energy to the circuit 8. That is, if a sixty-cycle sine-wave voltage of one volt is generated by the generator 9, the instrument 7 will indicate a substantially negligible current, and if a voltage of one volt is generated by the generator 9, at a frequency of 1600 cycles, the instrument 7 will indicate 11.9 milli-amperes. In other words, if the different frequencies generated by the generator 9 are plotted as abscissa in the diagram shown in Fig. 4, the ordinates of the curve will represent the indications of the instrument 7. Thus, if the curve represents the desired law of penalties, the instrument 7 will indicate in accordance with the law of the curve. In other words, if the generator 9 generates a distorted voltage wave, the several frequencies will be weighed or summated and the instrument 7 will indicate a value that may be a direct indication of the penalty factor or an indication that may be compared with the indication of the instrument 7 when the generator 9 generates a pure sine-wave of the same voltage and fundamental frequency as the distorted wave.

From the above it will be understood that the admittance of the circuit may be caused to vary in such manner that the portion of the system 1 in which the instrument 7 is connected will be traversed by current proportional to a predetermined function of the frequency of the generated voltage wave. Consequently, if the factor that is the ratio of the indication of the instrument 7, when supplied with the distorted voltage wave, to the indication of the instrument 7, when supplied with a sine-wave of the same square-root-of-the-mean-square voltage and fundamental frequency, is equal to, or lower than, a predetermined value, the voltage wave is commercially good. However, if the factor is larger than the agreed predetermined value, the voltage wave should be penalized in accordance therewith.

In Fig. 2 of the drawings, the measuring instrument 7 is adapted to be traversed by current in accordance with the law, as shown by the diagram in Fig. 5 of the drawings. That is, it may be determined that the diagram shown in Fig. 5 is the desired law of penalties to be imposed, and it has been shown to further illustrate the possibilities of my invention.

If it is determined that harmonics higher than the predetermined value do not affect the telephone circuit or the effect is of such value as to be negligible, the instrument 7, shown in Fig. 3 of the drawings, may be connected in a simple series circuit in which a condition of resonance may be obtained at that value of the frequency which is most detrimental. In other words, the curve representing the law of penalties will increase to a predetermined value and gradually decrease for all values of frequency above this value.

I do not limit my invention to the particular arrangement and circuits illustrated, as it may be variously modified without departing from the spirit and scope of the invention, as set forth in the appended claims.

I claim as my invention:

1. A measuring system comprising a reactor, a condenser, a resistor and a current-measuring device, said devices being so arranged that the admittance of the circuit thus constituted will vary in accordance with a predetermined function between the frequency and the inductive interference effect.

2. A measuring system comprising a reactor, a condenser, a resistor and a current-measuring device, said devices being so connected and of such values that the current traversing the measuring device varies in accordance with a predetermined function between the frequency and the inductive interference effect of the voltage applied to the system.

3. A measuring system comprising a reactor, a condenser, a resistor and a current-measuring device connected in series and so proportioned that the current traversing the measuring device varies in accordance with a predetermined curve representing a desired inductive interference effect.

4. A measuring system comprising a reactor, a condenser, a resistor and a current-measuring device, said devices being so connected and of such values that the current traversing the measuring device varies in accordance with a predetermined penalty curve representing the interference effect.

5. A penalty-indicating device for an electric circuit comprising a resistor, a reactor, a condenser and a current-measuring instrument so connected and having such values that the instrument will indicate in accordance with a predetermined function between frequency and inductive interference effect.

6. The method of determining the distortion of a distorted voltage wave which consists in impressing the said voltage wave upon a current-measuring instrument having capacitance, resistance and reactance in circuit therewith and observing the indication of the instrument, then impressing a sine wave of voltage of the same square-root-of-the-mean-square value and the same fundamental frequency on the instrument and observing its indication, and then dividing the former indiction by the latter.

7. The method of determining the distortion of a distorted voltage wave which consists in impressing the voltage upon a circuit comprising a resistor, a reactor, a condenser and a current-measuring instrument so arranged and proportioned that the current traversing the instrument varies as the inductive interference effect, and observing the indications of the instrument.

8. The method of determining the distortion of a distorted voltage wave which consists in impressing the voltage upon a circuit comprising a resistor, a reactor, a condenser and a current-measuring instrument so arranged and proportioned that its apparent admittance with respect to the fundamental frequency is a predetermined function of the frequency of the voltage wave having a predetermined inductive interference effect, and observing the indication of the instrument.

9. The method of determining the distortion of a distorted voltage wave which consists in impressing the voltage wave upon a current-measuring instrument having capacitance, resistance and inductance in circuit therewith and observing the indication of the instrument, and dividing this indication by a value that would be indicated thereby should an equal sine-wave voltage having a fundamental frequency be impressed thereon.

10. The method of determining the distortion of a distorted voltage wave which consists in impressing the voltage wave upon a measuring instrument having capacitance, resistance and inductance in circuit therewith and observing the indication of the instrument, and dividing this indication by a value that would be indicated thereby should an equal sine-wave voltage having a fundamental frequency be impressed thereon.

11. The method of determining the distortion factor of a distorted voltage wave which consists in impressing the voltage wave upon a measuring instrument having impedance in circuit therewith and observing the indication of the instrument, and dividing this indication by the value that would be indicated thereby should an equal sine-wave voltage of fundamental frequency be impressed thereon.

In testimony whereof, I have hereunto subscribed my name this 27th day of July, 1916.

LEWIS W. CHUBB.